(12) United States Patent
Haydu et al.

(10) Patent No.: US 12,742,295 B2
(45) Date of Patent: Sep. 22, 2026

(54) SYSTEM AND METHOD FOR WATERPROOFING RAILWAY STRUCTURES

(71) Applicant: Freedom Chemical Corporation, Foothill Ranch, CA (US)

(72) Inventors: Jonathan Wolff Haydu, San Diego, CA (US); Kyle David Flanagan, Rancho Santa Margarita, CA (US)

(73) Assignee: Freedom Chemical Corporation, Foothill Ranch, CA (US)

(*) Notice: Subject to any disclaimer, the term of this patent is extended or adjusted under 35 U.S.C. 154(b) by 0 days.

(21) Appl. No.: 19/446,703

(22) Filed: Jan. 12, 2026

(65) Prior Publication Data

US 2026/0139443 A1 May 21, 2026

Related U.S. Application Data

(63) Continuation-in-part of application No. 19/067,521, filed on Feb. 28, 2025, which is a continuation of (Continued)

(51) Int. Cl.
*E01B 19/00* (2006.01)
*B32B 3/26* (2006.01)
(Continued)

(52) U.S. Cl.
CPC .............. *E01B 19/00* (2013.01); *B32B 3/266* (2013.01); *B32B 5/02* (2013.01); *B32B 7/12* (2013.01);
(Continued)

(58) Field of Classification Search
CPC ..... E01B 19/00; E01B 2204/07; B32B 3/266; B32B 5/02; B32B 7/12; B32B 27/06; B32B 27/08; B32B 27/32
See application file for complete search history.

(56) References Cited

U.S. PATENT DOCUMENTS 4,151,025 A 4/1979 Melvin
4,233,356 A 11/1980 Jacobs
(Continued)

FOREIGN PATENT DOCUMENTS

CN 106243972 A 12/2016
CN 114621660 A 6/2022
(Continued)

OTHER PUBLICATIONS

U.S. Appl. No. 63/799,325, Invention Title "Double Crown Cricket (Guiding Water To a Drain or Particular Location)", Drainage Plan—Span 1 (Span 4 Similar), 2-way Sloped Ballast Mat Application; Plan View—Span 1 & 4, Transverse Crown Sloping to Deck Drains at Bents; Pyramid Type Systems, Drainage Plan—Span 1 (Span 4 Similar), 2-way Sloped Ballast Mat Application; filed Sep. 2025, 3 pages.

*Primary Examiner* — Robert J McCarry, Jr.
(74) *Attorney, Agent, or Firm* — Knobbe, Martens, Olson & Bear, LLP

(57) ABSTRACT

A protective waterproofing structure can include a waterproof membrane applied over a bed of the transportation structure. The protective waterproofing structure can include a layered membrane protection structure to protect the waterproof membrane. The layered protection structure can include a plurality of membrane protection layers. The plurality of membrane protection layers can include: a first layer including a first surface area, the first layer applied over the waterproof membrane; a second layer including a second surface area that is smaller than the first surface area, the second layer transitioning to the first layer along an edge. Each layer of the plurality of membrane protection layers can include only an elastomeric fluid material and enable flow of water over the layered membrane protection structure toward a drainage outlet.

20 Claims, 13 Drawing Sheets

Related U.S. Application Data application No. 18/776,822, filed on Jul. 18, 2024, now Pat. No. 12,241,207.

(51) Int. Cl.

| | |
|---|---|
| ***B32B 5/02*** | (2006.01) |
| ***B32B 7/12*** | (2006.01) |
| ***B32B 27/06*** | (2006.01) |
| ***B32B 27/08*** | (2006.01) |
| ***B32B 27/32*** | (2006.01) |

(52) U.S. Cl.

CPC .............. *B32B 27/06* (2013.01); *B32B 27/08* (2013.01); *B32B 27/32* (2013.01); *E01B 2204/07* (2013.01)

(56) References Cited

U.S. PATENT DOCUMENTS

| | | | | |
|---|---|---|---|---|
| 4,774,795 | A | 10/1988 | Braun | |
| 5,185,013 | A | 2/1993 | Martin | |
| 6,450,729 | B1 | 9/2002 | Clapp | |
| 6,619,879 | B1 | 9/2003 | Scuero | |
| 7,597,503 | B2 | 10/2009 | Hinding | |
| 7,896,255 | B2 | 3/2011 | Frenzel | |
| 8,499,394 | B1 | 8/2013 | Haydu | |
| 8,826,481 | B1 | 9/2014 | Haydu | |
| 9,234,321 | B2 | 1/2016 | Haydu | |
| 9,441,335 | B2 | 9/2016 | Haydu | |
| 9,869,065 | B2 | 1/2018 | Haydu | |
| 9,995,010 | B2 | 6/2018 | Haydu | |
| 10,036,131 | B2 | 7/2018 | Pascetta | |
| 10,132,049 | B2 | 11/2018 | Haydu | |
| 10,184,243 | B2 | 1/2019 | Hamilton | |
| 10,415,197 | B2 * | 9/2019 | Haydu | E01B 2/003 |
| 10,612,198 | B2 | 4/2020 | Haydu | |
| 12,241,207 | B1 | 3/2025 | Haydu et al. | |
| 2015/0113745 | A1 | 4/2015 | Haydu | |
| 2016/0115657 | A1 | 4/2016 | Haydu | |
| 2018/0106001 | A1 | 4/2018 | Robinson | |
| 2018/0127931 | A1 | 5/2018 | Pascetta | |
| 2025/0230611 | A1 | 7/2025 | Howson et al. | |

FOREIGN PATENT DOCUMENTS

| | | | |
|---|---|---|---|
| CN | 119192978 | A | 12/2024 |
| KR | 10-1036277 | B1 | 5/2011 |
| KR | 10-2174938 | B1 | 11/2020 |
| KR | 10-2286256 | B1 | 8/2021 |
| WO | WO 2021/209971 | A1 | 10/2021 |

* cited by examiner 200
100

SLOPE
℄ WATERPROOFING CROWNS 200
100

200
100
℄ WATERPROOFING CROWNS

200
SPAN 1
SPAN 2
SPAN 3
SPAN 4
SPAN 5
SPAN 6
SPAN 7
SPAN 8
SPAN 9
SPAN 10
250
260
250
A
A
B
B 200
200
100
210
Section A-A Section B-B Legend
Layer 1
Layer 2
Layer 3
Layer 4

110

120
110
250
250

130
120
110
250

140
130
120
110
250

200
250
110
120
130
140
100

200
100
255
250

250
200

100

SYSTEM AND METHOD FOR WATERPROOFING RAILWAY STRUCTURES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to waterproofing of railway structures, and more particularly to waterproofing railway structures with a spray applied protection layer that excludes a filler material (e.g., granulated rubber).

Description of the Related Art

Railway structures, such as railroad bridge decks, can deteriorate, for example from temperature and weather cycles, loading and unloading cycles when trains pass over them, as well as from corrosion. Additionally, railway structures experience contraction and expansion, due to temperature cycles during the day and weather changes during the year, which can result in their deterioration over time. Railroad structures use a ballast or ballast rock to provide stability to the railroad tracks. However, ballast rock traps water and keeps it on the bridge deck. Waterproofing of railroad structures is intended to protect the bridge deck from corrosion and/or deterioration due to the presence of water. However, existing waterproofing systems are complex, require several steps and specialized equipment to apply, and do not adequately direct the flow of water, which make waterproofing applications more time consuming, costly and require specialized training of personnel. One existing waterproofing system includes spraying a mixture incorporating granulated rubber onto a ballast mat, but requires application of an additional sealing layer thereover since air intermixes with the granulated rubber during the spraying process, resulting in the layer of granulated rubber being porous.

SUMMARY

Accordingly, there is a need for a simpler waterproofing system and method for transportation structures, such as railway structures (e.g., railroad bridge decks) that do not require specialized equipment or use filler material (e.g., granulated rubber). In one example, a protection layer is used to provide a protective layer between the waterproofing membrane and ballast.

Furthermore, another concern relates to the impact of water on the transportation structure. For example, in a rain event, if the rainwater is not directed adequately, it can result in accumulation of moisture, increased hydrostatic loading, accelerated corrosion of structural components, etc. Accordingly, a need exists for a waterproofing system that enables controlled flow of water away from various structural components through, for example, one or more membrane protection layers that form a sloped profile. The protective waterproofing structure of the present disclosure provides a simplified profile of one or more membrane protection layers that form a sloped profile. Such profile can enable the flow of water to a drainage outlet (e.g., a scupper) in transverse and/or longitudinal directions, thereby reducing the risks associated with water accumulation on the bridge deck.

Another concern relates to complexity of design and installation method of membrane protection layers that can provide a sloped profile. Complex designs and installation methods can lead to installation errors in the field and/or increase costs. Advantageously, the protective waterproofing structure of the present disclosure provides a simplified design that enables crews with less or no specialized training to achieve the desired results, thereby reducing the overall costs and risks associated with errors. For example, each layer of the membrane protection system can include a generally uniform thickness, allowing the operator to simply apply each layer with a generally consistent thickness before moving on to the next layer.

Another concern relates to design and integration of a protective waterproofing structure with other components of a transportation structure. For example, waterproofing structures that cannot easily be coordinated with other components of a waterproofing system, such as a drainage outlet, can cause various design and installation challenges. Advantageously, the protective waterproofing structure of the present disclosure enables flow of water in a longitudinal and/or transverse direction of a transportation structure, thereby facilitating the flow of water to different drainage outlets that may be located in different areas of the transportation structure (e.g., edges or ends of a bridge deck) or outside the transportation structure (e.g., nearby road).

In some aspects, the techniques described herein relate to a waterproofing structure for a railway structure, including: a waterproof membrane configured to be applied over a bed of the railway structure; and a membrane protection layer configured to be applied over the waterproof membrane, the membrane protection layer excluding a filler material.

In some aspects, the techniques described herein relate to a railway structure, including: a bed including a material chosen of a group consisting of, concrete, steel, wood or timber, and brick, and a combination of concrete and steel; and a waterproofing structure disposed over the bed, the waterproofing structure consisting of: a waterproof membrane disposed over the bed, and a membrane protection layer disposed over the waterproof membrane, the membrane protection layer excluding a filler material.

In some aspects, the techniques described herein relate to a method for waterproofing a railway structure, including: applying a waterproof membrane over a bed of the railway structure; and applying a membrane protection layer over the waterproof membrane, the membrane protection layer excluding a filler material.

In some aspects, the techniques described herein relate to a protective waterproofing structure for a transportation structure. the waterproofing structure can include: a waterproof membrane configured to be applied over a bed of the transportation structure; and/or a layered membrane protection structure configured to protect the waterproof membrane. The layered membrane protection structure can include a plurality of membrane protection layers including: a first layer having a first geometrical shape including a first surface area, the first layer applied over the waterproof membrane; and a second layer having a second geometrical shape including a second surface area that is smaller than the first surface area, the second layer configured to transition to the first layer along an edge. Each layer of the plurality of membrane protection layers includes only an elastomeric fluid material. The elastomeric fluid material can be configured to cure to provide protection over the waterproof membrane. The edge can form a slope along a perimeter of the second surface to enable flow of water over the layered membrane protection structure toward a drainage outlet.

In some aspects, the techniques described herein relate to a protective waterproofing structure, wherein the edge is a tapered edge.

In some aspects, the techniques described herein relate to a protective waterproofing structure, wherein the first geometrical shape is one of rectangle, parallelogram, rhombus, or trapezoid.

In some aspects, the techniques described herein relate to a protective waterproofing structure, wherein the first geometrical shape is same as the second geometrical shape.

In some aspects, the techniques described herein relate to a protective waterproofing structure, wherein the layered membrane protection structure further includes a third layer having a third geometrical shape including a third surface area. The third surface area can be smaller than the second surface area.

In some aspects, the techniques described herein relate to a protective waterproofing structure, wherein the first layer can include a thickness of about 0.25 inch.

In some aspects, the techniques described herein relate to a protective waterproofing structure, wherein the elastomeric fluid material can be a polyurea foam.

In some aspects, the techniques described herein relate to a protective waterproofing structure, wherein the drainage outlet can include a drainpipe.

In some aspects, the techniques described herein relate to a protective waterproofing structure for a transportation structure. The waterproofing structure can include: a waterproof membrane configured to be applied over a bed of the transportation structure; and a layered membrane protection structure configured to protect the waterproof membrane. The layered membrane protection structure can include a plurality of membrane protection layers including: a first layer having a first surface area, the first layer applied over the waterproof membrane; and a second layer having a second surface area that is smaller than the first surface area, the second layer applied over the first layer and configured to transition to the first layer along an edge. Each layer of the plurality of membrane protection layers can be configured to provide a uniform non-porous layer and includes a single elastomeric material excluding a filler material. The edge can form a slope along a perimeter of the second surface to enable flow of water over the layered membrane protection structure.

In some aspects, the techniques described herein relate to a protective waterproofing structure, wherein the edge can form a right angle between the first layer and the second layer.

In some aspects, the techniques described herein relate to a protective waterproofing structure, wherein the water can flow over the layered membrane protection structure to a drainage outlet.

In some aspects, the techniques described herein relate to a protective waterproofing structure, wherein the first layer and the second layer can include a thickness of about 0.5 inch.

In some aspects, the techniques described herein relate to a protective waterproofing structure, wherein the layered membrane protection structure can include polyurea foam.

In some aspects, the techniques described herein relate to a protective waterproofing structure, wherein the layered membrane protection structure can include a third layer having a third surface that is smaller than the second surface. The third layer can be applied over the second layer.

In some aspects, the techniques described herein relate to a protective waterproofing structure. The layered membrane protection structure can include a fourth layer having a fourth surface that is smaller than the third surface. The fourth layer can be applied over the third layer.

In some aspects, the techniques described herein relate to a protective waterproofing structure, wherein the layered membrane protection structure can include a generally pyramidal cross section.

In some aspects, the techniques described herein relate to a method for waterproofing a railway structure. The method can including: applying a waterproof membrane over a bed of the railway structure; applying a first layer of a layered membrane protection structure over the waterproof membrane; and applying a second layer of the layered membrane protection structure over the first layer such that the second layer includes a surface area that is smaller than the surface area of the first layer, and the second layer forms a sloped tapered edge along a perimeter of the second layer to transition to the first layer. Each layer of the layered membrane protection structure can include only an elastomeric fluid material. The elastomeric fluid material can be configured to cure to provide protection over the waterproof membrane. The edge can form a slope along a perimeter of the second surface to enable flow of water over the layered membrane protection structure.

In some aspects, the techniques described herein relate to a method, where applying the layered membrane protection structure can be performed with a spray gun.

In some aspects, the techniques described herein relate to a method, wherein the spray gun can include a nozzle. The nozzle can have a round tip. The spray gun can be configured to dispense less material around the perimeter of each layer of the layered membrane protection structure.

In some aspects, the techniques described herein relate to a method, wherein the second layer can transition to the first layer with a tapered edge to facilitate a flow of water over the layered membrane protection structure.

BRIEF DESCRIPTION OF THE DRAWINGS

FIGS. 12A-13B illustrate various cross sections through the transportation structure of FIG. 11.

DETAILED DESCRIPTION

Figure 1:
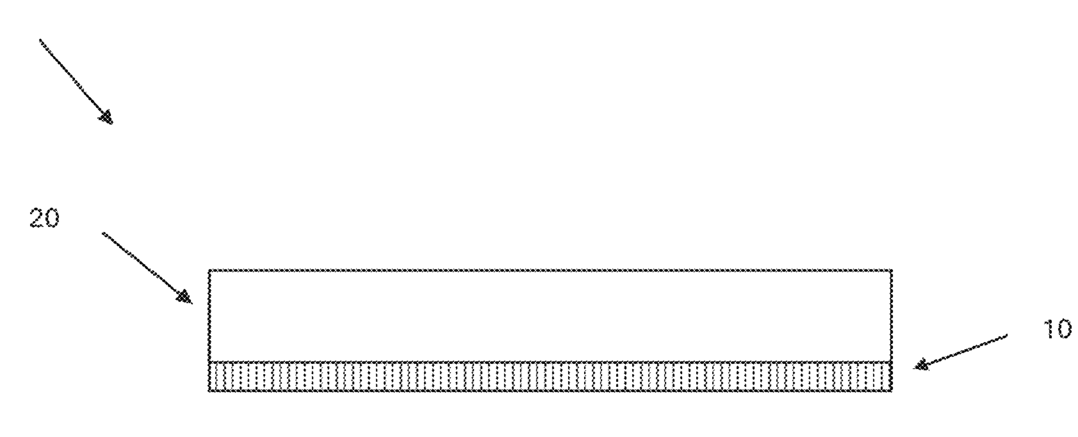
FIG. 1 is a schematic cross-sectional view of a waterproofing structure.

FIG. 1 shows a waterproofing structure 1 for use on a transportation structure, such as railway structures, which can be for example railroad bridge decks (e.g. made of concrete or steel). The waterproofing structure 1 includes a waterproof membrane 10 and a membrane protection layer 20. The waterproof membrane 10 can be, for example, an elastomeric coating that can be applied (e.g., with a hose and spray gun) as one or more liquid coatings or layers and that cures to form a waterproof barrier. In one example, the elastomeric coating can be polyurea. In one example, the waterproof membrane 10 can have a thickness of between about 50 mils and about 150 mils (e.g., between 0.050 inches and 0.150 inches), such as between about 80 mils and about 120 mils (e.g., between 0.080 inches and 0.120 inches).

The membrane protection layer 20 can be spray applied elastomeric foam that is fast setting, rapid curing, flexible and impact resistant. In one example, the membrane protection layer 20 is a spray applied polyurea foam that is flexible and impact resistant. In one example, the membrane protection layer 20 is a single layer (e.g., does not require application of multiple layers). In one example, the spray applied polyurea foam can have a gel time of about 7 seconds (at 68° F. using ASTM D1640 standard) and a tack free time of about 16 seconds (at 68° F. using ASTM D1640 standard), a shore hardness of greater than 55A (using ASTM D2240 standard), a tensile strength of greater than 300 psi (using ASTM D412 standard) and an elongation of greater than 75% (using ASTM D412 standard). The spray applied polyurea foam can have zero volatile organic compounds (VOCs). In one example, the membrane protection layer 20 can have a minimum thickness of between about 150 mils and about 200 mils (e.g., between 0.250 inches and 0.200 inches), such as a minimum thickness of at least about 170 mils (0.170 inches), and meets the American Railway Engineering and Maintenance-of-way Association (AREMA) Ballast Impact Test (e.g., meets the AREMA Ballast Impact Test specified in the 2022 AREMA Manual for Railway Engineering, which can be found in Chapter 8, part 29.9.10d).

Figure 2:
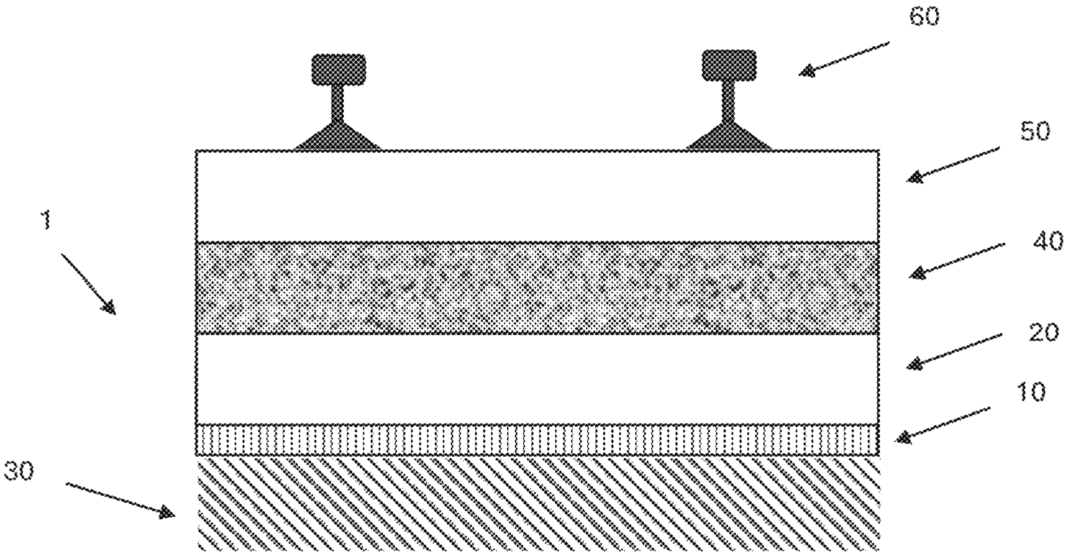
FIG. 2 is a schematic cross-sectional view of the waterproofing structure installed in a railway structure.

FIG. 2 shows the waterproofing structure 1 installed in a transportation structure, for example a railway structure. The waterproof membrane 10 can be applied (e.g., sprayed, uniformly applied) over or onto at least a portion of (e.g., all of, less than all of) a bed 30 to provide a liquid tight seal thereon. The bed 30 can be concrete, steel, timber or wood, brick or a combination of these (e.g., concrete and steel). In one example the railway structure is a railroad bridge deck. The membrane protection layer 20 can be applied (e.g., sprayed, uniformly applied) onto or over the waterproof membrane 10, as discussed above. A ballast 40 is applied or disposed over the membrane protection layer 20. The ballast 40 is made of rock (e.g., crushed granite). Railway ties 50 are applied or disposed over the ballast 40, and rails 60 are disposed over the railway ties 50. In some examples, a primer layer is applied (e.g., sprayed) to or disposed on the bed 30 before application of the waterproof membrane 10 is applied. The primer can in some examples be made of epoxy or urethane. However, the primer can be made of other suitable materials. The primer layer can advantageously facilitate adherence of the waterproof membrane 10 over the bed 30 to provide a watertight seal over the bed 30. Advantageously, the membrane protection layer 20 excludes (e.g., does not require) a filler material (e.g., rubber granules) intermixed with the elastomeric foam material. Advantageously, the waterproofing structure 1 excludes (e.g., does not require) a sealing layer applied over the membrane protection layer 20.

Figure 3:
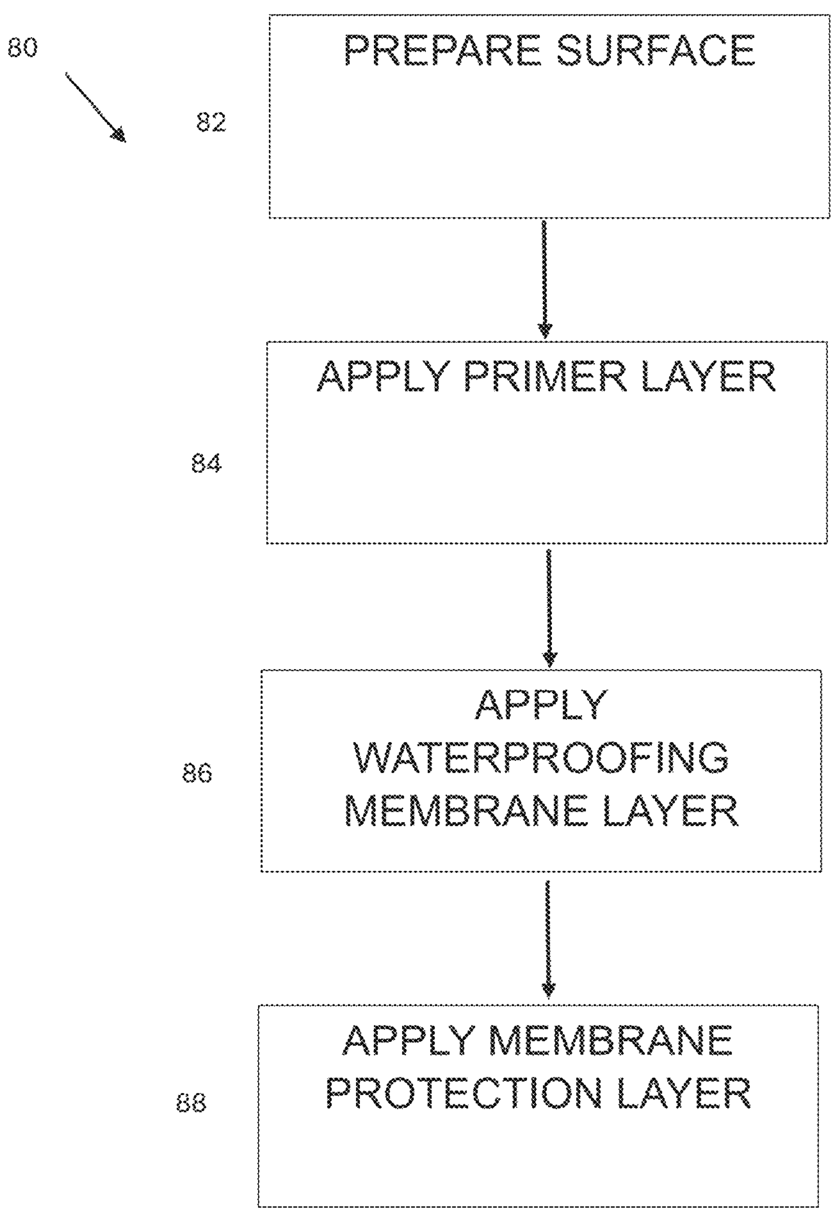
FIG. 3 is a flowchart illustrating a method of waterproofing a railway structure.

FIG. 3 shows a method 80 of forming or applying a waterproof structure, for example on a railway structure (e.g., railroad bridge deck) or other transportation structure. The method 80 includes the step 82 of preparing the surface (e.g., of the bed onto which the waterproof structure will be applied). The method 80 includes the step 84 of applying a primer layer on the underlying surface (e.g., a concrete surface). This step is optional if the underlying surface is steel. The method 80 includes the step 86 of applying the waterproofing membrane layer (e.g., waterproof membrane 10 described above). The method includes the step 86 of applying the membrane protection layer (e.g., the membrane protection layer 20 described above) over the waterproof membrane layer, where the membrane protection layer and waterproof membrane layer form the waterproof structure.

FIGS. 4A-13B illustrate various examples of a waterproofing structure. Any of the devices, assemblies, systems, and/or methods described herein with respect to FIGS. 4A-13B may be similar or identical to and/or incorporate any of the features described and/or illustrated with respect to any of the devices, assemblies, systems, and/or methods described herein with respect to FIGS. 1-3. Any of the features described and/or illustrated with respect to any of the devices, assemblies, systems, and/or methods described herein with respect to FIGS. 4A-13B may be incorporated into the devices, assemblies, systems, and/or methods described herein with respect to FIGS. 1-3.

Figures 4A, 4B:
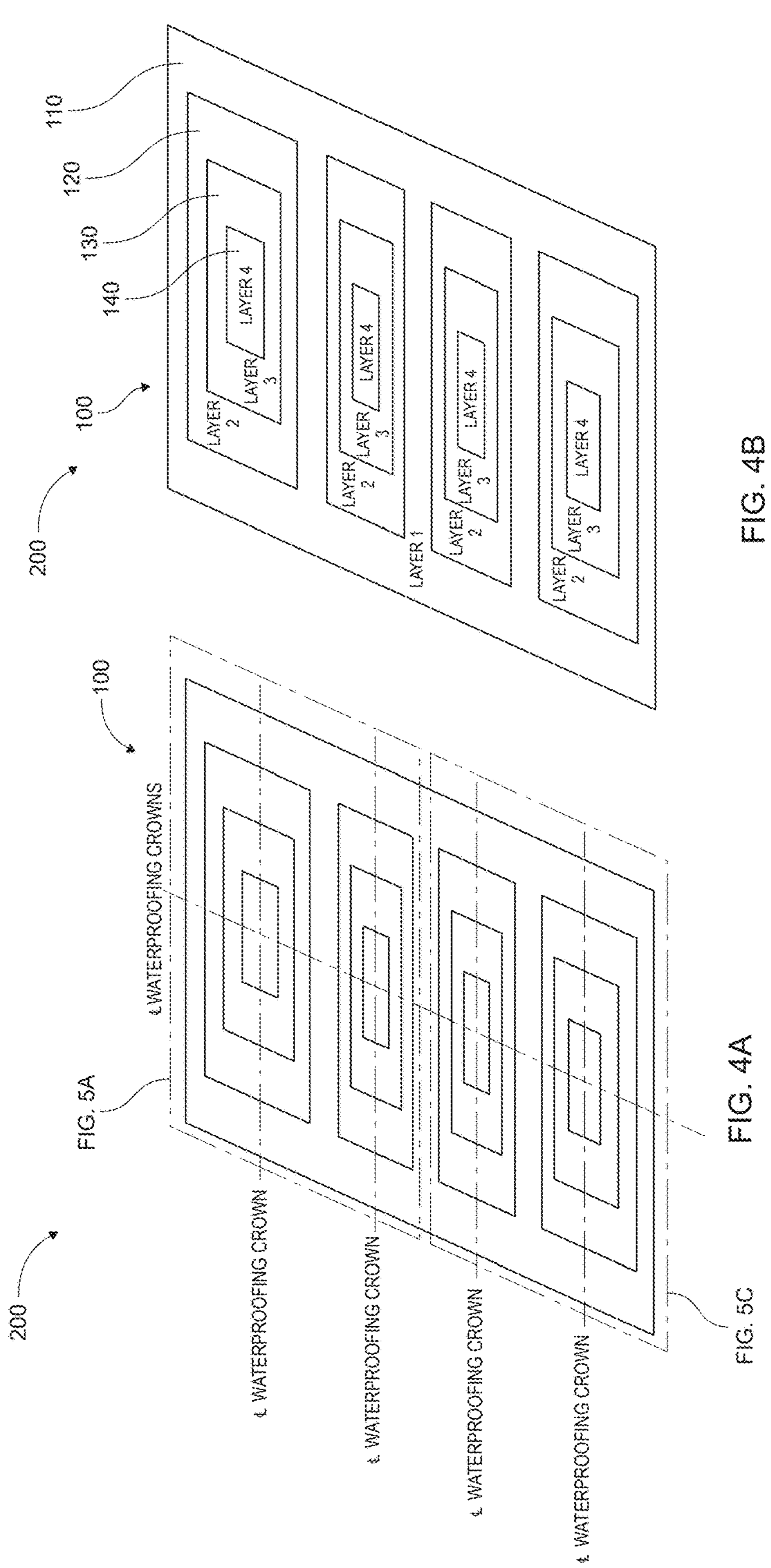
FIGS. 4A-4B are schematic views of a waterproofing structure according to one example.

FIG. 4A is a schematic view of a portion of a transportation structure 200, including a layered membrane protection structure 100 according to one example. The layered membrane protection structure 100 can be a component of a water drainage system in the transportation structure 200. The layered membrane protection structure 100 can facilitate the flow of water over a waterproof membrane. In one example, the layered membrane protection structure 100 directs the flow of water to a drainage outlet. The layered membrane protection structure 100 can be formed to include one or more high points (i.e., a crown) that facilitate sloping the membrane protection layer(s) such that the water moves towards the edges of the transportation structure. The layered membrane protection structure 100 can include one or more crowns along the longitudinal axis (e.g., along a length direction) of the transportation structure. In one example, the one or more crowns are positioned along the center line of the transportation structure. In one example, the layered membrane protection structure 100 can also include one or more crowns along the transverse axis (e.g., along a width direction) of the transportation structure. Advantageously, this allows the layered membrane protection structure 100 to direct a flow of water in both longitudinal and transverse directions, thereby providing a more efficient drainage system.

FIG. 4B is another schematic view of a portion of a transportation structure 200, including a layered membrane protection structure 100 according to one example. The layered membrane protection structure 100 can include one or more membrane protection layers having the same or similar features as the membrane protection layer 20 disclosed elsewhere herein. In one example, the layered membrane protection structure 100 can include a first layer 110, a second layer 120, a third layer 130, and a fourth layer 140. Each of the first layer 110, second layer 120, third layer 130, and/or fourth layer 140 can include a generally uniform thickness that is applied over a preceding substrate. For example, the first layer 110 can be applied over a waterproofing membrane (such as the waterproof membrane 10 illustrated in FIGS. 1-2), the second layer 120 can be applied over the first layer 110, the third layer 130 can be applied over the second layer 120, the fourth layer 140 can be applied over the third layer 130, etc. Each of the aforementioned layers can take the form of the same, similar, or different geometrical shapes (e.g., rectangular, parallelogram, rhombus, trapezoid, etc.). The first layer 110 can be applied over an existing bedding (e.g., a bridge deck). Each subsequent layer of the layered membrane protection structure 100 can be applied over the preceding layer. Each subsequent layer of layered membrane protection structure 100 can include an area that is smaller than the area of the preceding layer. For example, the first layer 110 includes a larger surface area than the second layer 120; the second layer 120 includes a larger surface area than third layer 130; the third layer 130 includes a larger surface area than the fourth layer 140, etc. Accordingly, in one example, the resulting layered membrane protection structure 100 can have a profile that generally forms a pyramid (or other geometrical shapes depending on the geometry of the layered membrane protection structure 100), thereby forming a sloped profile that facilitates directing the flow of water from the higher elevation to a lower elevation, such as toward one or more drainage areas of the transportation structure 200 at the lower elevation.

Each layer of the layered membrane protection structure 100 can have the same or different thickness as other layers of the membrane protection structure 100. For example, the first layer 110 can have a thickness of about 0.12", about 0.25", about 0.30", about 0.50", less than about 0.12", more than about 0.50", or any other value depending on the user's needs. Similarly, the second layer 120, the third layer 130, the fourth layer 140, or any additional membrane protection layer can include a thickness of about 0.12", about 0.25", about 0.30", about 0.50", less than about 0.12", more than about 0.50", or any other value depending on the user's needs. Although FIG. 4B illustrates only four membrane protections layers, the layered membrane protection structure 100 can include any number of membrane protection layers to accommodate a user's need. For example, the layered membrane protection structure 100 can include one, two, three, four, five, six, nine, twelve, etc. layers of membrane protection layers.

Figures 5A, 5B, 5C, 5D:
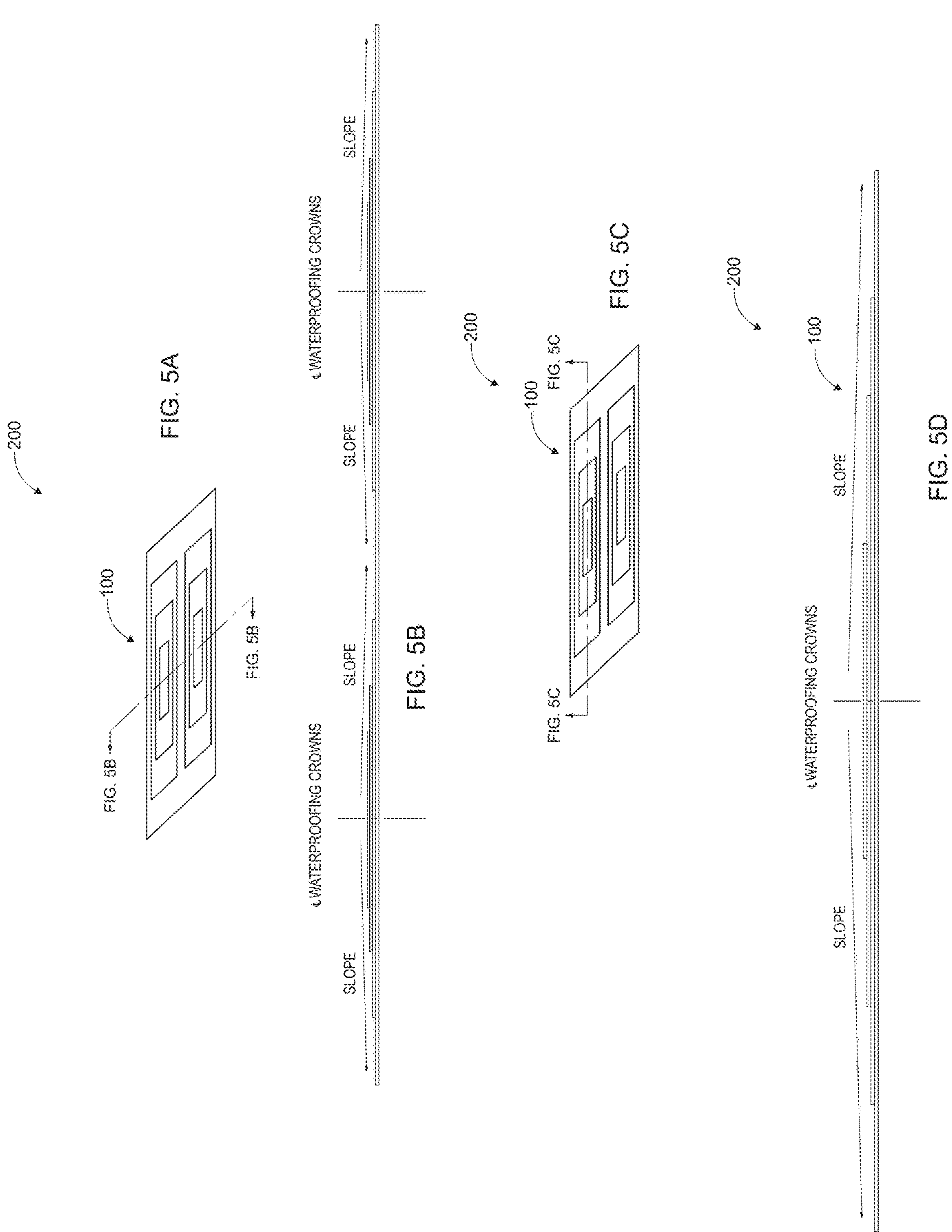
FIGS. 5A-5D illustrate cross sections of a waterproofing structure.

FIG. 5A is a portion of FIG. 4A, illustrating a longitudinal cross section through the layered membrane protection structure 100. FIG. 5B is the longitudinal cross section of FIG. 5A, including a first waterproofing crown and a second waterproofing crown spaced apart from the first waterproofing crown. Each of the first waterproofing crown and the second waterproofing crown includes a portion that is higher than the surrounding surfaces, thereby creating a slope of various degrees (e.g., about 0.25%, 0.50%, 0.75%, 1%, 2%, etc.) that facilitates the flow of water to the edges of the transportation structure along its longitudinal direction.

FIG. 5C is a portion of FIG. 4A, illustrating a transverse cross section through the layered membrane protection structure 100. FIG. 5D is the transverse cross section of FIG. 5B, including a waterproofing crown. As illustrated, the waterproofing crown includes a portion that is higher than the surrounding surfaces, thereby creating a slope of various degrees (e.g., about 0.25%, 0.50%, 0.75%, 1%, 2%, etc.) that facilitates the flow of water to the edges of the transportation structure along its transverse direction.

Figures 6A, 6B, 6C:
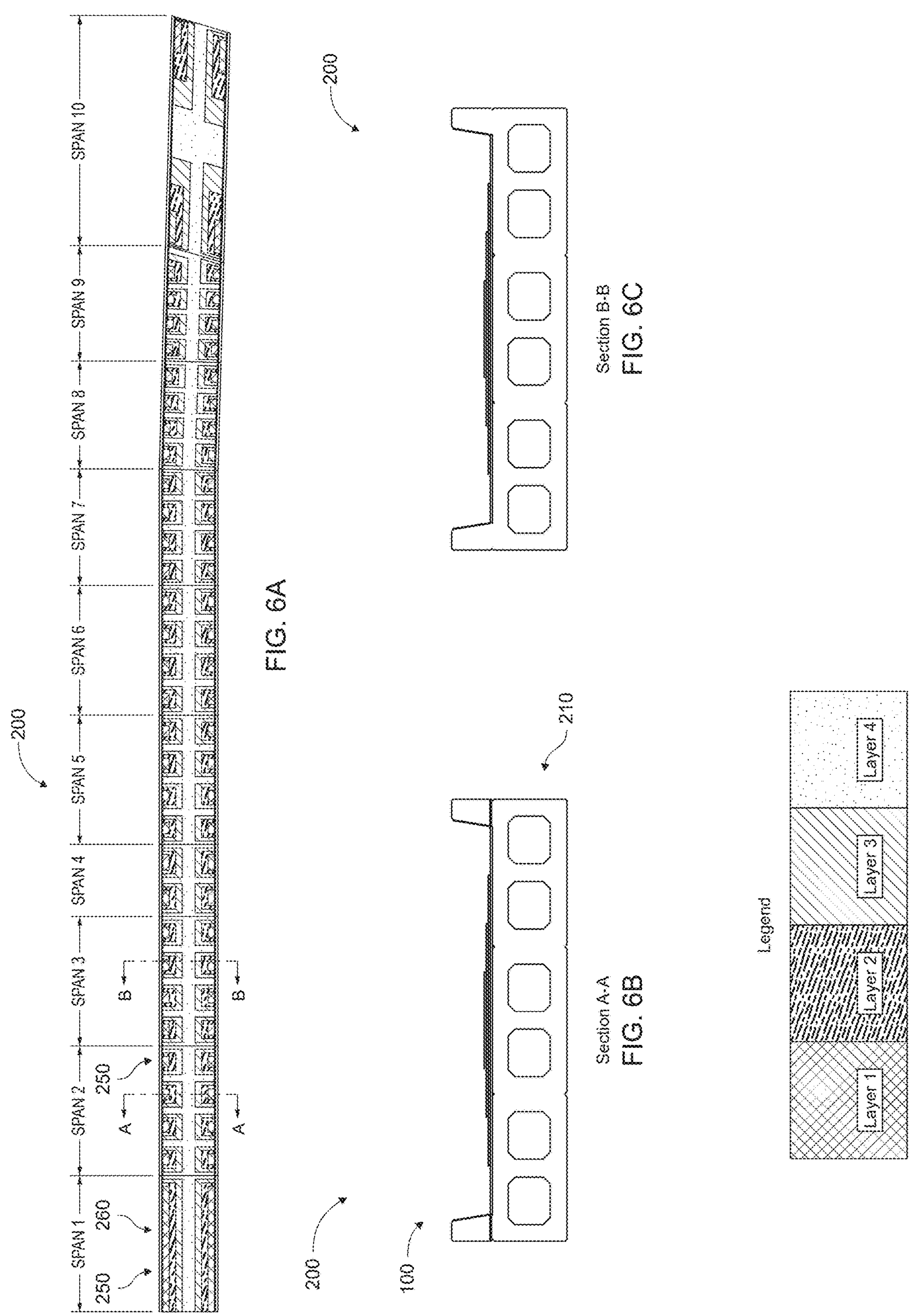
FIG. 6A is a top view of a transportation structure that includes a waterproofing structure according to another example.
FIGS. 6B-6C illustrate cross sections of the transportation structure of FIG. 6A.

FIG. 6A is a top view of a transportation structure 200 that includes a waterproofing structure according to another example. As illustrated, the transportation structure 200 can include one or more spans 260. Each span 260 of the transportation structure 200 can include a layered membrane protection structure 100 that is the same as, similar to, or different from the layered membrane protection structure 100 included in other spans of the transportation structure 200. Each span 260 of the transportation structure 200 can include one or more drainage areas 250. For example, each span 260 of the transportation structure 200 can include a continuous drainage area (e.g., SPAN 1) and/or a local drainage area (e.g., SPAN 2). In some examples, the drainage area 250 can be coupled to a drainage outlet (e.g., a drainpipe) that can discharge the water out of the transportation structure 200. In some examples, the drainage area 250 includes a continuous pathway along the edges of the transportation structure 200 that directs the flow of water along the transportation structure 200. In one example, the transportation structure 200 includes a continuous drainage area 250 that directs the flow of water to a drainage outlet. The drainage outlet can be located on the transportation structure or outside the transportation structure (e.g., on a nearby road). FIGS. 6B-6C illustrate cross sections of the transportation structure of FIG. 6A. As illustrated, the first, second, third, and fourth layers of the layered membrane protection structure 100 are placed over a preceding layer, thereby forming a sloped profile that can facilitate the flow of water to the edges of the transportation structure 200.

Figures 7A, 7B, 7C, 7D, 7E:
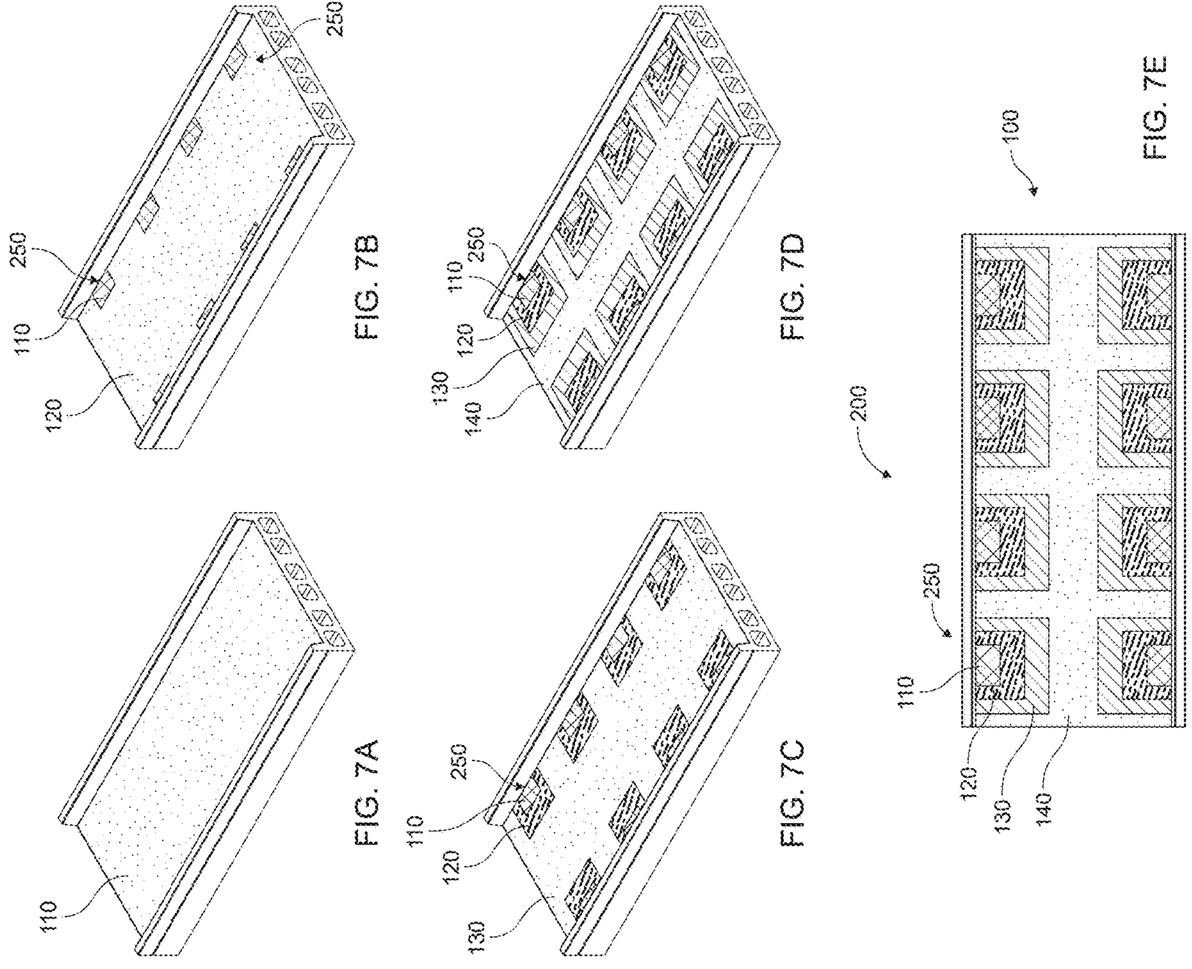
FIGS. 7A-7E illustrate a waterproofing structure at various stages of installation on a transportation structure.

FIGS. 7A-7E illustrate the waterproofing structure at various stages of installation. In one example, at a first stage (illustrated in FIG. 7A), the transportation structure 200 includes a first layer having a thickness of, for example, about 0.25" and includes a surface area that covers (e.g., partially or completely) the transportation structure 200; at a second stage (illustrated in FIG. 7B), the transportation structure 200 includes a second layer having a thickness of, for example, about 0.25" which is applied over a portion (e.g., excluding an area surrounding a drainage area 250, less than all) of the first layer such that the thickness of membrane protection layers at the area covered by the second layer is greater than the thickness of the first layer, for example about 0.50"; at a third stage (illustrated in FIG. 7C???), the transportation structure 200 includes a third layer having a thickness of, for example, about 0.25" which is applied over a portion (e.g., less than all) of the second layer such that the thickness of membrane protection layers at the area covered by the third layer is greater than the combined thickness of the first and second layers, for example about 0.75"; at a fourth stage (illustrated in FIG. 7D), the transportation structure 200 includes a fourth layer having a thickness of, for example, about 0.25" which is applied over a portion (e.g., less than all) of the third layer such that the thickness of membrane protection layers at the area covered by the fourth layer is greater than the combined thickness of the first, second and third layers, for example about 1". Advantageously, this arrangement creates a sloped profile that directs the flow of water to the edges of the transportation structure. FIG. 7E illustrates a portion of the transportation structure 200 at the completion of the fourth stage according to one example. The following table illustrates example dimensions of various layers around a drainage area 250:

| Layer | Overall thickness (in inches) | Transverse dimension A (in feet) | Longitudinal dimension B (in feet) | Area ((A × B) - the area of the preceding layer) (in square feet) |
|---|---|---|---|---|
| 1 | 0.25 | 2.0 | 3.0 | 6.0 |
| 2 | 0.5 | 3.7 | 5.0 | 12.5 |
| 3 | 0.75 | 5.3 | 7.4 | 26.72 |
| 4 | 1 | 7.1 | 11.0 | 39.32 |

Figure 8A:
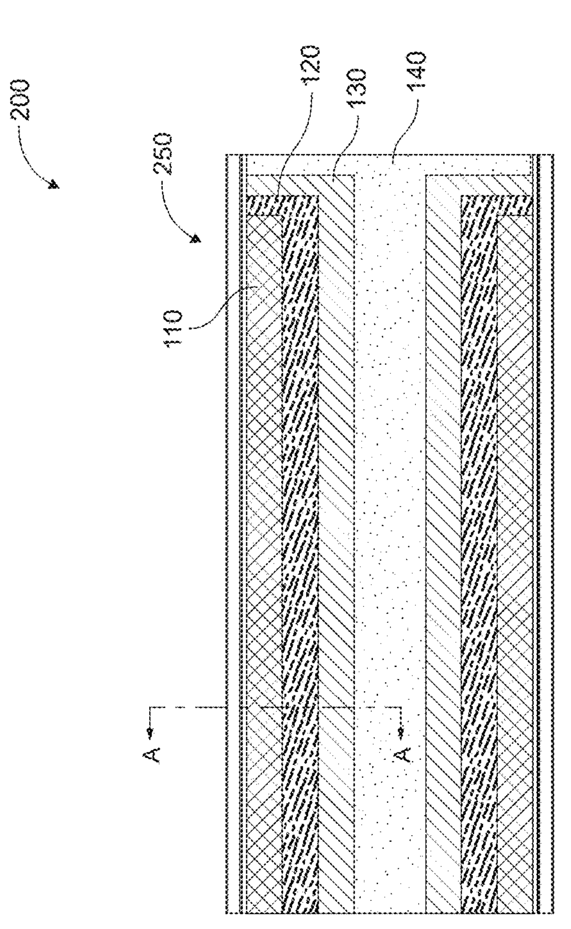
FIGS. 8A-8C illustrate another example of a waterproofing structure.
Figure 8C:
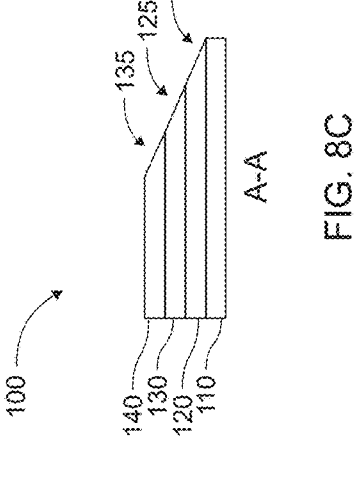
Figure 8B:
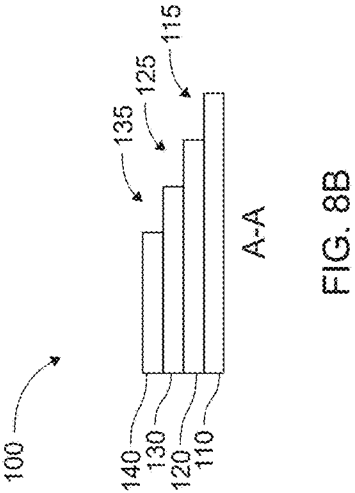

FIGS. 8A-8C illustrate another example of the layered membrane protection structure 100, including a drainage area 250 at the edges of the transportation structure 200. As discussed above, the drainage area 250 includes one or more membrane protection layers that are placed over one another. Each layer of membrane protection layer can form a transition with the preceding layer of water protection layer. For example, as illustrated in FIGS. 8B-8C, the second layer 120 can form a first transition 115 with the first layer 110, the third layer 130 can form a second transition 125 with the second layer 120, and/or the fourth layer 140 can form a third transition 135 with the third layer 130. The first transition 115, the second transition 125, and/or the third transition 135 can have different shapes. For example, depending on the manner the operator of a spray gun applies each layer and/or the type of spray nozzle that is used to apply each layer, the first transition 115, the second transition 125, and/or the third transition 135 can form a generally straight step edge (e.g., FIG. 8B) and/or a gradual tapered edge (e.g., FIG. 8C). In some examples, a spray gun with a nozzle having a round tip can be used to apply each layer of the layered membrane protection structure 100. This configuration of the nozzle can dispense less material around the perimeter of each layer, thereby allowing each membrane protection layer to have a smooth transition (e.g., as shown in FIG. 8C) with the layer below and facilitating a better flow of water throughout the transportation structure 200.

Figures 9A, 9B:
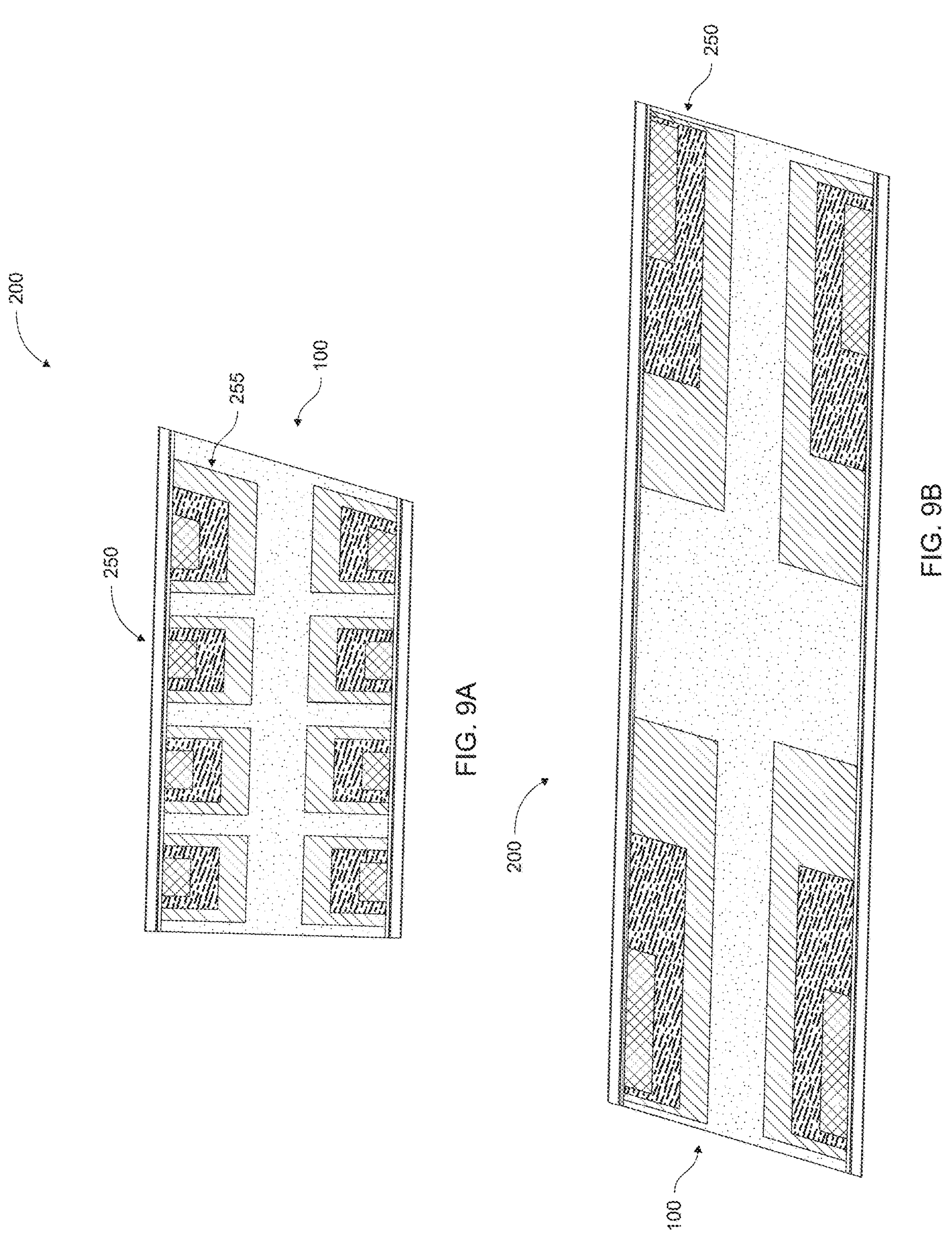
FIGS. 9A-9B illustrate another example of a waterproofing structure.

FIGS. 9A-9B illustrate another example of a waterproofing structure. The layered membrane protection structure 100 can be used with transportation structures 200 having different shapes. Accordingly, each layer of the layered membrane protection structure 100 can include different shapes and sizes to accommodate different transportation structures 200. For example, the transportation structure 200 can be oriented at an angle, and the drainage area can include one or more membrane protection layers having a generally trapezoidal area, such as the trapezoidal drainage area 255, to accommodate such angles. The drainage areas along the transportation structure 200 can have the same, similar, or different geometries. For example, as illustrated in FIG. 9A, the transportation structure 200 can include a generally trapezoidal drainage area 255 followed by one or more generally rectangular drainage areas 250. At the drainage area 250, each layer of the layered membrane protection structure 100 can form the same, similar, or different geometrical shapes (e.g., rectangular, round, trapezoidal, parallelogram, rhombus, etc.) and be oriented relative to one another in any desirable arrangement. In one example, each layer of the layered membrane protection structure 100 is aligned and centered with other layers of the layered membrane protection structure 100 along one side, as illustrated in FIG. 9A. In another example, each layer of the layered membrane protection structure 100 is aligned with but offset from other layers of the layered membrane protection structure 100 along one side, as illustrated in FIG. 9B.

Figures 10A, 10B:
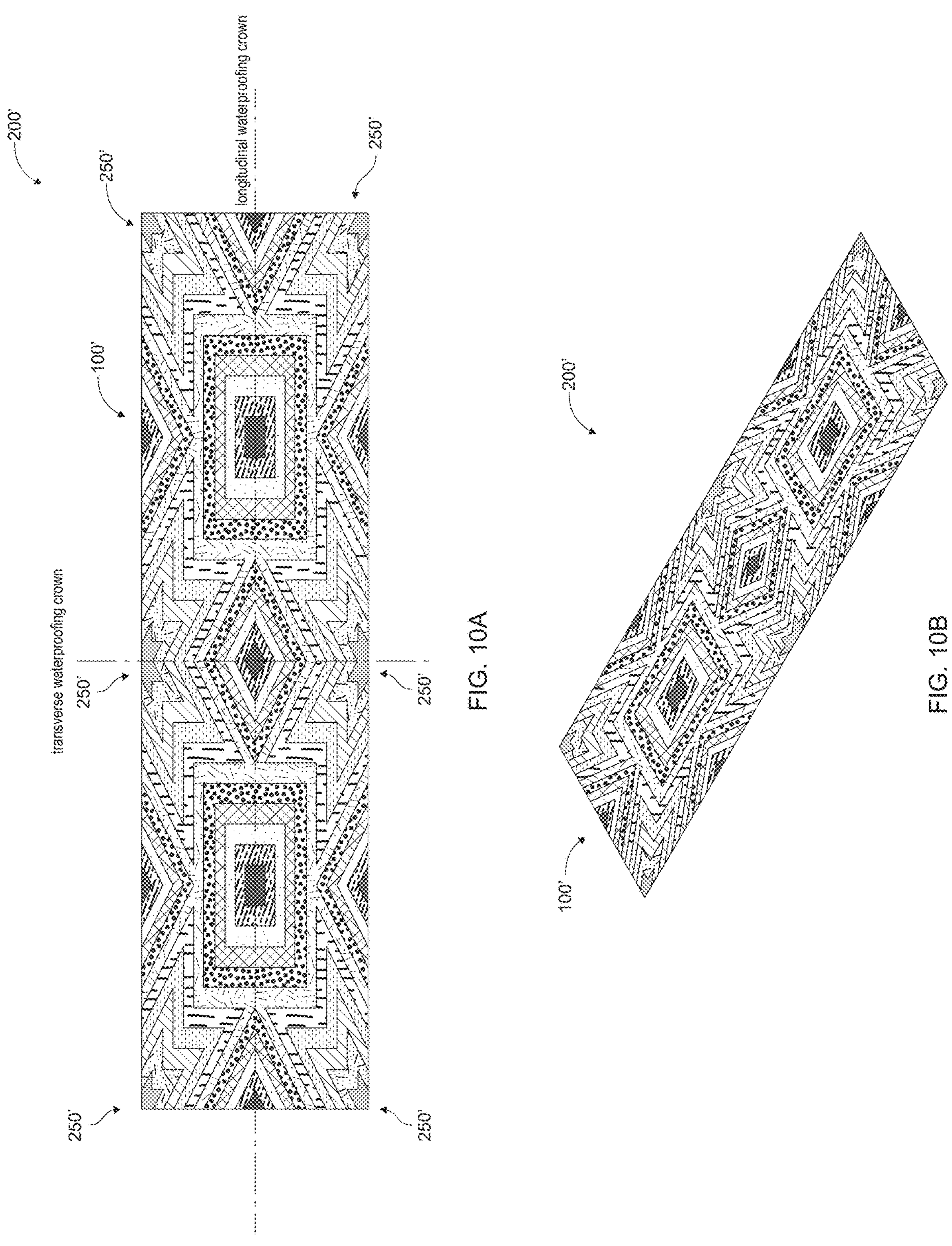
FIGS. 10A-10B illustrate another example of a waterproofing structure.

FIG. 10A is a top view of a waterproofing structure according to another example. FIG. 10B is the perspective view of the waterproof structure of FIG. 10A. As discussed above, the layered membrane protection structure 100' can include different shapes and orientations to direct the flow of water to a drainage area 250'. In the example of FIGS. 10A and 10B, a plurality of local drainage areas 250' are positioned around the perimeter of the transportation structure 200' to receive the water that is accumulated on the deck of the transportation structure 200'. A longitudinal waterproofing crown is illustrated along the transportation structure 200' to facilitate the flow of water to the respective edge of the transportation structure 200'. In one example, such as the example of FIG. 10A, the layers of the layered membrane protection structure 100' can be arranged to form a generally symmetrical structure along the longitudinal and transverse waterproofing crown. Each layer of the layered membrane protection structure 100' can include different shapes and/or different thicknesses in different parts of the transportation structure 200' to accommodate the user's need (e.g., to achieve the desirable slope). For example, different layers of the layered membrane protection structure 100' can include one or more triangular layers of the layered membrane protection structure 100' along the ends and sides of the transportation structure 200'; one or more rectangular layers of the layered membrane protection structure 100' in between the sides of the transportation structure 200'; and one or more layers of the layered membrane protection structure 100' in the shape of a rhombus, positioned generally at the center of the transportation structure 200' to form the longitudinal and transverse waterproofing crown, as illustrated in FIG. 10A.

Figure 11:
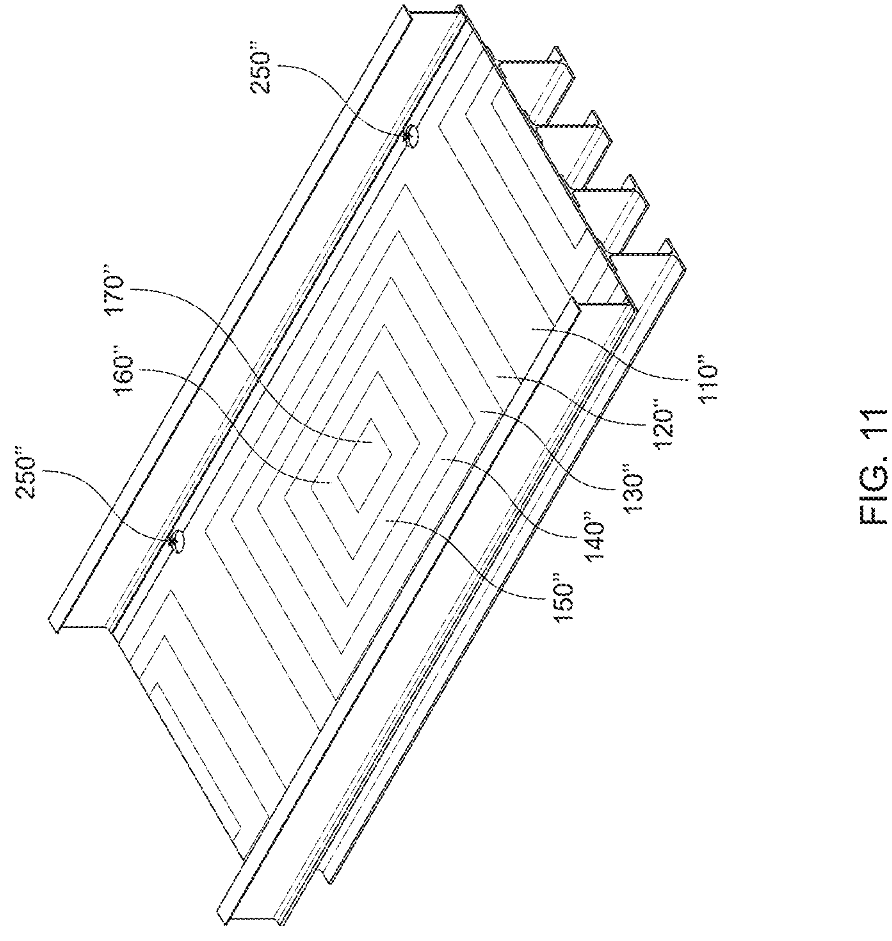
FIG. 11 is a perspective view of a transportation structure, including another example of a waterproofing structure.

FIG. 11 illustrates a perspective view of a transportation structure 200", including a waterproofing structure according to another example. The transportation structure 200'" can include a layered membrane protection structure 100". The layered membrane protection structure 100" can include all features of the layered membrane protection structure 100. The layered membrane protection structure 100" can include a first layer 110", a second layer 120", a third layer 130", a fourth layer 140", a fifth layer 150", a sixth layer 160", and a seventh layer 170". Each of the aforementioned layers can be placed over one another. Although FIG. 11 illustrates each layer of the layered membrane protection structure 100" applied in a rectangular pattern, the layered membrane protection structure 100" can also take the form of other geometrical shapes (e.g., parallelogram, rhombus, trapezoid, etc.). The first layer 110" can be applied over an existing bedding (e.g., a bridge deck). Each subsequent layer of the layered membrane protection structure 100" can be applied over the preceding layer. Each subsequent layer of layered membrane protection structure 100" can include an area that is smaller than the area of the preceding layer. For example, the first layer 110" includes a larger surface area than the second layer 120", the second layer 120" includes a larger surface area than third layer 130", etc. Accordingly, the resulting layered membrane protection structure 100" can have a profile that generally forms a pyramid, thereby forming a sloped profile that facilitates directing the flow of water from the higher elevation to one or more drainage areas 250 at the edges of the transportation structure 200".

Figures 12A, 12B, 12C, 12D:
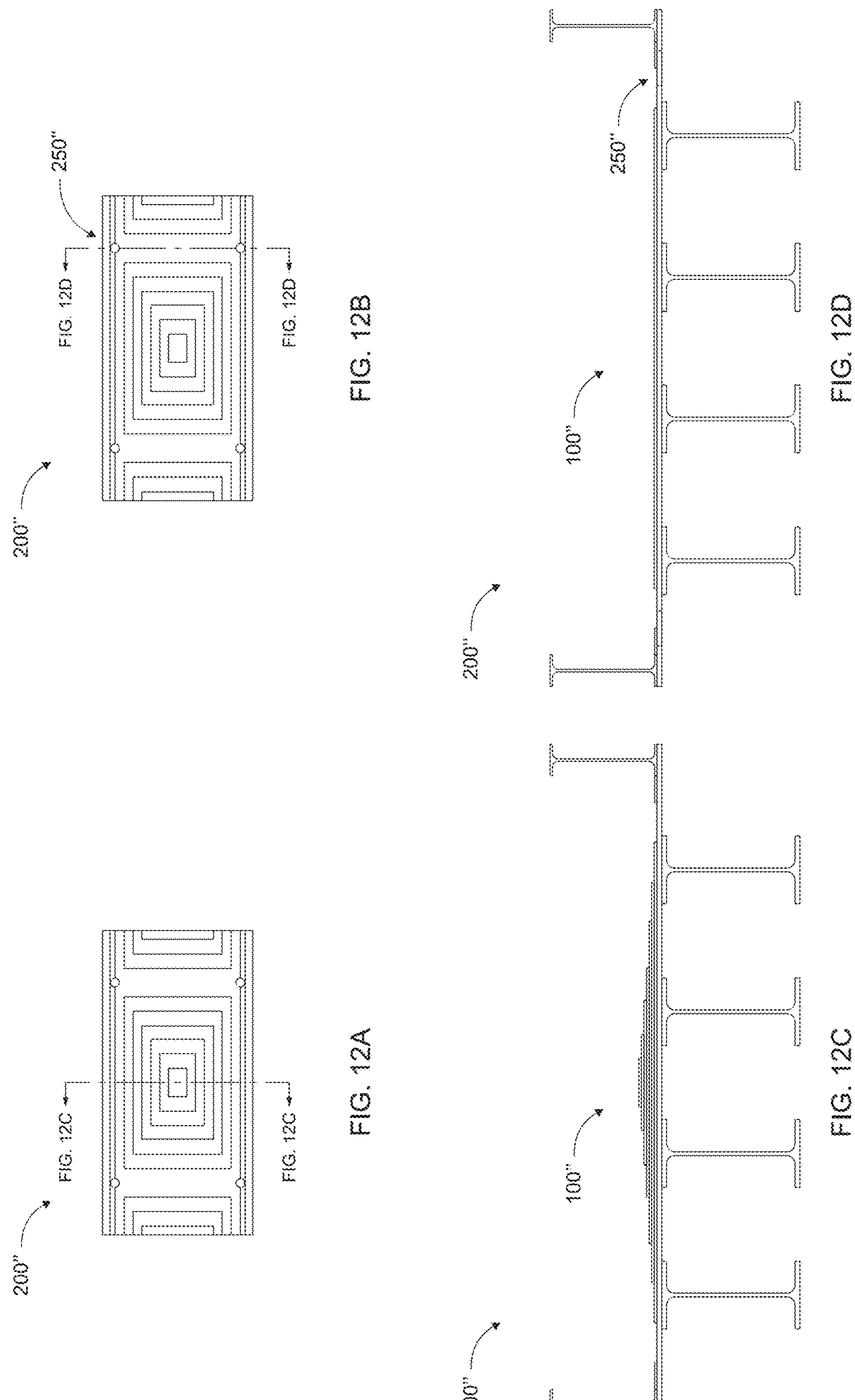
Figures 13A, 13B:
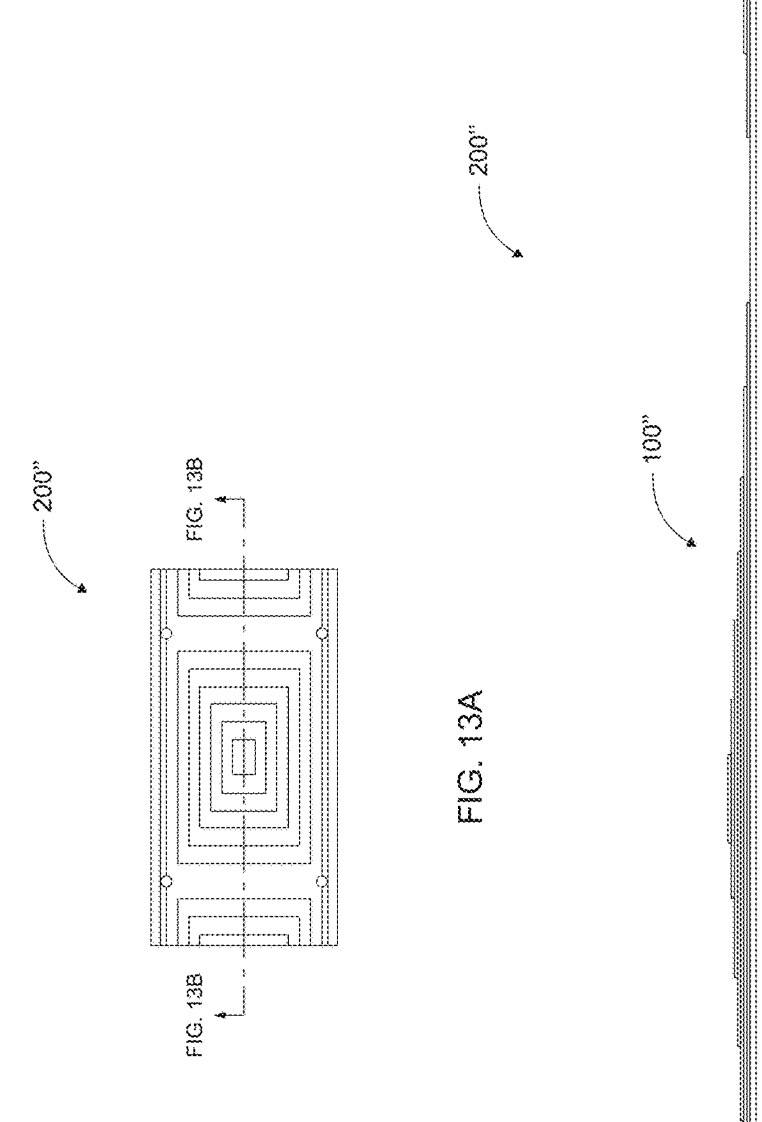

FIG. 12A illustrates a portion of the transportation structure 200", with a cross section across a transverse crown of the transportation structure 200" according to one example. FIG. 12C is the cross section of FIG. 12A, illustrating various layers of the layered membrane protection structure 100". FIG. 12B illustrates a cross section across the transportation structure 200" at drainage areas 250". FIG. 12D is the cross section of FIG. 12B, the layered membrane protection structure 100". FIG. 13A illustrates a cross section across a longitudinal crown of the transportation structure 200". FIG. 13B is the cross section of FIG. 13A, illustrating various layers of the layered membrane protection structure 100".

Figure 14:
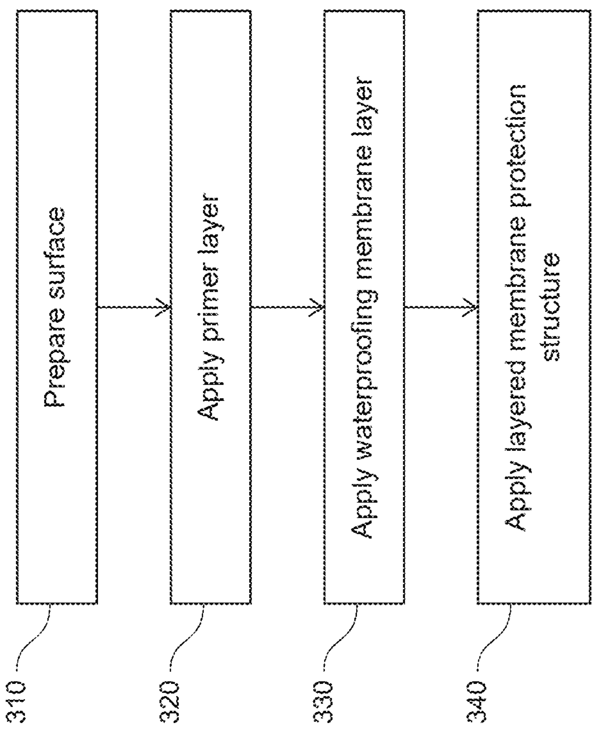
FIG. 14 is a flowchart illustrating a method of waterproofing a railway structure according to another example.

FIG. 14 illustrates a method 300 of forming or applying a waterproof structure, for example on a railway structure (e.g., railroad bridge deck) or other transportation structure. The method 300 includes the step 310 of preparing the surface (e.g., of the bed onto which the waterproof structure will be applied). The method 300 includes the step 320 of applying a primer layer on the underlying surface (e.g., a concrete surface). This step can be optional. For example, if the underlying surface is steel, the user may not need to apply a primer layer on the underlying surface. The method 300 includes the step 330 of applying the waterproofing membrane layer (e.g., waterproof membrane 10 described above). The method 300 includes the step 340 of applying the layered membrane protection structure over the waterproof membrane layer. Applying the layered membrane protection structure can include: applying a first layer of layered membrane protection structure over the waterproofing membrane layer; applying a second layer of layered membrane protection structure over a portion (e.g., less than all) of the first layer, the second layer having a surface area that is smaller than the first layer; applying a third layer of layered membrane protection structure over a portion (e.g., less than all) of the second layer, the third layer having a surface area that is smaller than the second layer; applying a fourth layer of layered membrane protection structure over a portion (e.g., less than all) of the third layer, the fourth layer having a surface area that is smaller than the third layer. Additional layers of membrane protection layers can be applied over the preceding layer(s) in a same or similar manner to accommodate the user's need (e.g., to achieve the desired slope and/or thickness of protection over the waterproof membrane layer). The membrane protection layer(s) and waterproof membrane layer form the waterproofing structure.

Additional Embodiments

In embodiments of the present disclosure, a waterproofing structure for a railway structure, railway structure and method for waterproofing a railway structure may be in accordance with any of the following clauses:

Clause 1. A waterproofing structure for a railway structure, comprising: a waterproof membrane configured to be applied over a bed of the railway structure; and a membrane protection layer configured to be applied over the waterproof membrane, the membrane protection layer excluding a filler material.

Clause 2. The waterproofing structure of Clause 1, wherein the membrane protection layer has a thickness greater than a thickness of the waterproof membrane.

Clause 3. The waterproofing structure of Clause 2, wherein the waterproof membrane has a thickness of between about 0.050 inches and 0.150 inches.

Clause 4. The waterproofing structure of Clause 3, wherein the membrane protection layer has a minimum thickness of about 0.170 inches.

Clause 5. The waterproofing structure of any preceding clause, wherein the waterproof membrane is a polyurea coating.

Clause 6. The waterproofing structure of any preceding clause, wherein the membrane protection layer is a polyurea foam.

Clause 7. The waterproofing structure of any preceding clause, wherein the membrane protection layer is a single layer.

Clause 8. A railway structure, comprising: a bed comprising a material chosen of a group consisting of, concrete, steel, wood or timber, and brick, and a combination of concrete and steel; and a waterproofing structure disposed over the bed, the waterproofing structure consisting of: a waterproof membrane disposed over the bed, and a membrane protection layer disposed over the waterproof membrane, the membrane protection layer excluding a filler material.

Clause 9. The railway structure of Clause 8, wherein the membrane protection layer has a thickness greater than a thickness of the waterproof membrane.

Clause 10. The railway structure of Clause 9, wherein the waterproof membrane has a thickness of between about 0.050 inches and 0.150 inches.

Clause 11. The railway structure of Clause 10, wherein the membrane protection layer has a minimum thickness of about 0.170 inches.

Clause 12. The railway structure of any of Clauses 8-11, wherein the waterproof membrane is a polyurea coating.

Clause 13. The railway structure of any of Clauses 8-12, wherein the membrane protection layer is a polyurea foam.

Clause 14. The railway structure of any of Clauses 8-13, wherein the membrane protection layer is a single layer.

Clause 15. The railway structure of any of Clauses 8-14, further comprising a primer layer disposed between the waterproof membrane and the bed.

Clause 16. A method for waterproofing a railway structure, comprising: applying a waterproof membrane over a bed of the railway structure; and applying a membrane protection layer over the waterproof membrane, the membrane protection layer excluding a filler material.

Clause 17. The method of Clause 16, wherein applying the membrane protection layer includes spraying a polyurea foam over the waterproof membrane.

Clause 18. The method of Clause 17, wherein spraying the polyurea foam over the waterproof membrane consists of spraying a single layer of the polyurea foam over the waterproof membrane, the single layer having a minimum thickness of 0.170 inches.

Clause 19. The method of Clause 18, wherein applying the waterproof membrane comprises applying a liquid polyurea coating having a thickness of between about 0.050 inches and 0.150 inches.

Clause 20. The method of any of Clauses 16-19, further comprising applying a primer layer over the bed of the railway structure prior to applying the waterproof membrane.

Clause 21. A protective waterproofing structure for a transportation structure, the waterproofing structure comprising: a waterproof membrane configured to be applied over a bed of the transportation structure; and a layered membrane protection structure configured to protect the waterproof membrane, the layered membrane protection structure comprising a plurality of membrane protection layers comprising: a first layer having a first geometrical shape comprising a first surface area, the first layer applied over the waterproof membrane; a second layer having a second geometrical shape comprising a second surface area that is smaller than the first surface area, the second layer configured to transition to the first layer along an edge; wherein each layer of the plurality of membrane protection layers comprises only an elastomeric fluid material, the elastomeric fluid material configured to cure to provide protection over the waterproof membrane, and the edge forms a slope along a perimeter of the second surface to enable flow of water over the layered membrane protection structure toward a drainage outlet.

Clause 22: The protective waterproofing structure of Clause 21, wherein the edge is a tapered edge.

Clause 23: The protective waterproofing structure of any of Clauses 21-22, wherein the first geometrical shape is one of rectangle, parallelogram, rhombus, or trapezoid.

Clause 24: The protective waterproofing structure of any of Clauses 21-23, wherein the first geometrical shape is same as the second geometrical shape.

Clause 25: The protective waterproofing structure of any of Clauses 21-24, wherein the layered membrane protection structure further comprises a third layer having a third geometrical shape comprising a third surface area, the third surface area smaller than the second surface area.

Clause 26: The protective waterproofing structure of any of Clauses 21-25, wherein the first layer comprises a thickness of about 0.25 inch.

Clause 27: The protective waterproofing structure of any of Clauses 21-26, wherein the elastomeric fluid material is a polyurea foam.

Clause 28: The protective waterproofing structure of any of Clauses 21-27, wherein the drainage outlet comprises a drainpipe.

Clause 29: A protective waterproofing structure for a transportation structure, the waterproofing structure comprising: a waterproof membrane configured to be applied over a bed of the transportation structure; and a layered membrane protection structure configured to protect the waterproof membrane, the layered membrane protection structure comprising a plurality of membrane protection layers comprising: a first layer having a first surface area, the first layer applied over the waterproof membrane; a second layer having a second surface area that is smaller than the first surface area, the second layer applied over the first layer and configured to transition to the first layer along an edge; wherein each layer of the plurality of membrane protection layers is configured to provide a uniform non-porous layer and comprises a single elastomeric material excluding a filler material, and the edge forms a slope along a perimeter of the second surface to enable flow of water over the layered membrane protection structure.

Clause 30: The protective waterproofing structure of Clause 29, wherein the edge forms a right angle between the first layer and the second layer.

Clause 31: The protective waterproofing structure of any of Clauses 29-30, wherein the water flows over the layered membrane protection structure to a drainage outlet.

Clause 32: The protective waterproofing structure of any of Clauses 29-31, wherein the first layer and the second layer comprise a thickness of about 0.5 inch.

Clause 33: The protective waterproofing structure of any of Clauses 29-32, wherein the layered membrane protection structure comprises polyurea foam.

Clause 34: The protective waterproofing structure of any of Clauses 29-33, wherein the layered membrane protection structure comprises a third layer having a third surface that is smaller than the second surface, the third layer applied over the second layer.

Clause 35: The protective waterproofing structure of any of Clauses 29-34, wherein the layered membrane protection structure comprises a fourth layer having a fourth surface that is smaller than the third surface, the fourth layer applied over the third layer.

Clause 36: The protective waterproofing structure of any of Clauses 29-35, wherein the layered membrane protection structure comprises a generally pyramidal cross section.

Clause 37: A method for waterproofing a railway structure, comprising: applying a waterproof membrane over a bed of the railway structure; applying a first layer of a layered membrane protection structure over the waterproof membrane; applying a second layer of the layered membrane protection structure over the first layer such that the second layer comprises a surface area that is smaller than the surface area of the first layer, and the second layer forms a sloped tapered edge along a perimeter of the second layer to transition to the first layer; wherein each layer of the layered membrane protection structure comprises only an elastomeric fluid material, the elastomeric fluid material configured to cure to provide protection over the waterproof membrane, and the edge forms a slope along a perimeter of the second surface to enable flow of water over the layered membrane protection structure.

Clause 38: The method of Clause 37, where applying the layered membrane protection structure is performed with a spray gun.

Clause 39: The method of Clause 38, wherein the spray gun comprises a nozzle having a round tip, the spray gun configured to dispense less material around the perimeter of each layer of the layered membrane protection structure.

Clause 40: The method of Clause 39, wherein the second layer transitions to the first layer with a tapered edge to facilitate a flow of water over the layered membrane protection structure.

While certain embodiments of the invention have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A protective waterproofing structure for a transportation structure, the waterproofing structure comprising:

a waterproof membrane configured to be applied over a bed of the transportation structure; and a layered membrane protection structure configured to protect the waterproof membrane, the layered membrane protection structure comprising a plurality of membrane protection layers comprising:

a first layer having a first geometrical shape comprising a first surface area, the first layer applied over the waterproof membrane; and a second layer having a second geometrical shape comprising a second surface area that is smaller than the first surface area, the second layer configured to transition to the first layer along an edge;

wherein each layer of the plurality of membrane protection layers comprises only an elastomeric fluid material, the elastomeric fluid material configured to cure to provide protection over the waterproof membrane, and the edge forms a slope along a perimeter of the second surface to enable flow of water over the layered membrane protection structure toward a drainage outlet.

2. The protective waterproofing structure of claim 1, wherein the edge is a tapered edge.

3. The protective waterproofing structure of claim 1, wherein the first geometrical shape is one of rectangle, parallelogram, rhombus, or trapezoid.

4. The protective waterproofing structure of claim 1, wherein the first geometrical shape is same as the second geometrical shape.

5. The protective waterproofing structure of claim 1, wherein the layered membrane protection structure further comprises a third layer having a third geometrical shape comprising a third surface area, the third surface area smaller than the second surface area.

6. The protective waterproofing structure of claim 1, wherein the first layer comprises a thickness of about 0.25 inch.

7. The protective waterproofing structure of claim 1, wherein the elastomeric fluid material is a polyurea foam.

8. The protective waterproofing structure of claim 1, wherein the drainage outlet comprises a drainpipe.

9. A protective waterproofing structure for a transportation structure, the waterproofing structure comprising:

a waterproof membrane configured to be applied over a bed of the transportation structure; and a layered membrane protection structure configured to protect the waterproof membrane, the layered membrane protection structure comprising a plurality of membrane protection layers comprising:

a first layer having a first surface area, the first layer applied over the waterproof membrane; and a second layer having a second surface area that is smaller than the first surface area, the second layer applied over the first layer and configured to transition to the first layer along an edge;

wherein each layer of the plurality of membrane protection layers is configured to provide a uniform nonporous layer and comprises a single elastomeric material excluding a filler material, and the edge forms a slope along a perimeter of the second surface to enable flow of water over the layered membrane protection structure.

10. The protective waterproofing structure of claim 9, wherein the edge forms a right angle between the first layer and the second layer.

11. The protective waterproofing structure of claim 9, wherein the water flows over the layered membrane protection structure to a drainage outlet.

12. The protective waterproofing structure of claim 9, wherein the first layer and the second layer comprise a thickness of about 0.5 inch.

13. The protective waterproofing structure of claim 9, wherein the layered membrane protection structure comprises polyurea foam.

14. The protective waterproofing structure of claim 9, wherein the layered membrane protection structure comprises a third layer having a third surface that is smaller than the second surface, the third layer applied over the second layer.

15. The protective waterproofing structure of claim 14, wherein the layered membrane protection structure comprises a fourth layer having a fourth surface that is smaller than the third surface, the fourth layer applied over the third layer.

16. The protective waterproofing structure of claim 15, wherein the layered membrane protection structure comprises a generally pyramidal cross section.

17. A method for waterproofing a railway structure, comprising:

applying a waterproof membrane over a bed of the railway structure;

applying a first layer of a layered membrane protection structure over the waterproof membrane; and applying a second layer of the layered membrane protection structure over the first layer such that the second layer comprises a surface area that is smaller than the surface area of the first layer, and the second layer forms a sloped tapered edge along a perimeter of the second layer to transition to the first layer;

wherein each layer of the layered membrane protection structure comprises only an elastomeric fluid material, the elastomeric fluid material configured to cure to provide protection over the waterproof membrane, and the edge forms a slope along a perimeter of the second surface to enable flow of water over the layered membrane protection structure.

18. The method of claim 17, where applying the layered membrane protection structure is performed with a spray gun.

19. The method of claim 18, wherein the spray gun comprises a nozzle having a round tip, the spray gun configured to dispense less material around the perimeter of each layer of the layered membrane protection structure.

20. The method of claim 19, wherein the second layer transitions to the first layer with a tapered edge to facilitate a flow of water over the layered membrane protection structure.

* * * * *